US012695954B2

(12) United States Patent
Bercun et al.

(10) Patent No.: US 12,695,954 B2
(45) Date of Patent: Jul. 28, 2026

(54) METHODS AND SYSTEMS FOR CONTENT MANAGEMENT

(71) Applicant: Comcast Cable Communications, LLC, Philadelphia, PA (US)

(72) Inventors: Stuart Bercun, Medford, NJ (US); Fei Wan, Warrington, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 13 days.

(21) Appl. No.: 18/484,922

(22) Filed: Oct. 11, 2023

(65) Prior Publication Data

US 2025/0126330 A1      Apr. 17, 2025

(51) Int. Cl.
   *H04N 21/478*     (2011.01)
   *H04L 67/52*     (2022.01)
   *H04N 21/858*     (2011.01)

(52) U.S. Cl.
   CPC ......... *H04N 21/4781* (2013.01); *H04L 67/52* (2022.05); *H04N 21/8586* (2013.01)

(58) Field of Classification Search
   CPC . H04N 21/4781; H04N 21/8586; H04L 67/52
   See application file for complete search history.

(56) References Cited

U.S. PATENT DOCUMENTS

| | | | |
|---|---|---|---|
| 10,008,212 B2 | 6/2018 | Lynch et al. | |
| 2001/0034237 A1* | 10/2001 | Garahi | ................ G07F 17/3288 |
| | | | 455/456.3 |
| 2010/0324977 A1* | 12/2010 | Dragt | .................... G06Q 30/02 |
| | | | 705/14.62 |
| 2016/0241864 A1* | 8/2016 | Loyd | .................. H04N 21/4524 |
| 2017/0272824 A1* | 9/2017 | Bunner | .............. H04N 21/8586 |
| 2019/0013879 A1* | 1/2019 | Webster | ................ H04B 11/00 |
| 2019/0173590 A1 | 6/2019 | Mufti | |
| 2020/0051534 A1* | 2/2020 | Bradley | .................. G10H 1/40 |

FOREIGN PATENT DOCUMENTS

| | | | | | |
|---|---|---|---|---|---|
| GB | 2572529 A | * | 10/2019 | ............. | G06F 3/165 |
| WO | WO-2023086686 A1 | * | 5/2023 | ........... | G06F 16/955 |

* cited by examiner

*Primary Examiner* — Nicholas T Corbo
(74) *Attorney, Agent, or Firm* — Ballard Spahr LLP

(57) ABSTRACT

Methods and systems for content management are described. If programming content is distributed to viewers, inaudible audio signals associated with the content may be output along with the content. If a user device detects the one or more inaudible signals, the user device may automatically navigate to a website, launch one or more applications, or send requests for services.

20 Claims, 6 Drawing Sheets

300

400

410

RECEIVE CONTENT COMPRISING DATA ASSOCIATED WITH ONE OR MORE WAGERING SERVICES

420

CAUSING AN OUTPUT DEVICE TO EMIT AN INAUDIBLE SIGNAL ASSOCIATED WITH THE ONE OR MORE WAGERING SERVICES

500

510

DETECT INAUDIBLE AUDIO SIGNAL

520

SEND REQUEST FOR WAGERING OPPORTUNITIES

530

RECEIVE WAGERING OPPORTUNITIES

METHODS AND SYSTEMS FOR CONTENT MANAGEMENT

BACKGROUND

Much of the content consumed on television may be associated with other content such as websites, advertisements, or the like. Currently, in order to access the other content, users may need to physically handle a user device and manually interact with the content by, for example, typing a web address into a browser or scanning a QR code. This leads to human error and frustration for users.

SUMMARY

It is to be understood that both the following general description and the following detailed description are exemplary and explanatory only and are not restrictive. Methods and systems for content management are described. Data may be inserted into content or otherwise sent to a media device wherein the data is configured to cause output, via the media device or an associated device, of one or more inaudible audio signals. User devices nearby may detect the one or more inaudible audio signals and automatically launch one or more applications, navigate to one or more websites, or take other actions.

BRIEF DESCRIPTION OF THE DRAWINGS

The accompanying drawings, which are incorporated in and constitute a part of this specification, show examples and together with the description, serve to explain the principles.

DETAILED DESCRIPTION

Figure 1:
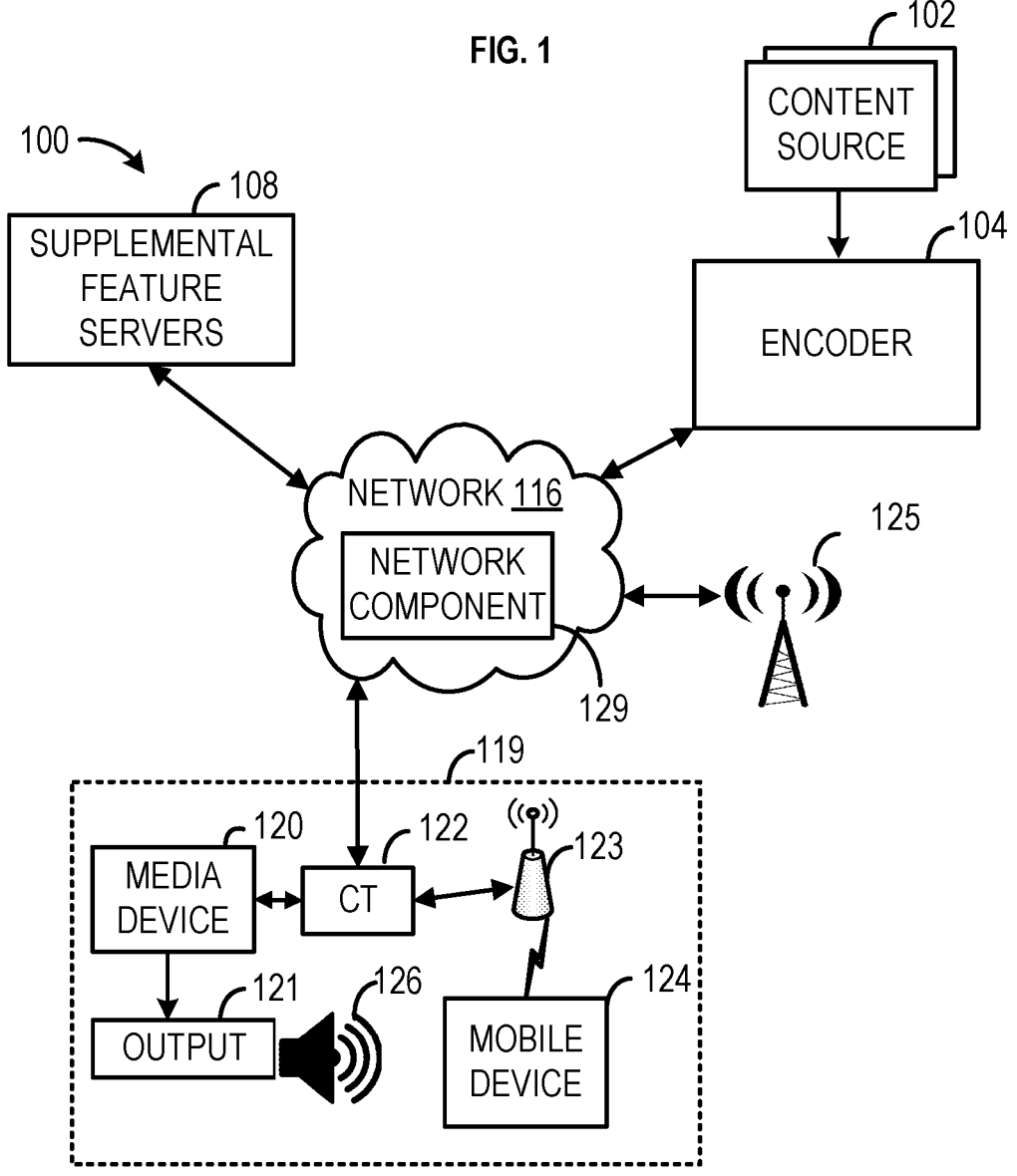
FIG. 1 shows an example system.

As used in the specification and the appended claims, the singular forms "a," "an." and "the" include plural referents unless the context clearly dictates otherwise. Ranges may be expressed herein as from "about" one particular value, and/or to "about" another particular value. If such a range is expressed, another configuration includes from the one particular value and/or to the other particular value. Similarly, if values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is to be understood that if combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information." Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic advertisement insertion data (.csv), Adobe® Photoshop® (.PSD) format or some other format for electronically storing text, graphics and/or other information whether such format is presently known or developed in the future. Content items may be any combination of the above-described formats.

This detailed description may refer to a given entity performing some action. It should be understood that this language may in some cases mean that a system (e.g., a computer) owned and/or controlled by the given entity is actually performing the action.

The present methods and systems provide an improvement in interactive content and related technologies by automatically launching one or more application, automatically navigating to one or more websites, and/or automatically accessing content without user intervention. Previously, users had to interact with user devices such as smart phones to manually enter web addresses displayed in content, scan QR codes or other similar techniques. The use of one or more inaudible signals to trigger the one or more applications, navigate to one or more websites, or access content improves computing efficiency and eliminates redundancies.

FIG. 1 shows a system 100 for content distribution. Those skilled in the art will appreciate that digital equipment and/or analog equipment may be employed. Those skilled in the art will appreciate that provided herein is a functional description and that the respective functions may be performed by software, hardware, or a combination of software and hardware.

The system 100 may comprise a content source 102, an encoder 104, one or more wagering services 108, a media device 120, an output device 121, a mobile device 124, and one or more other devices. Each of the content source 102, the encoder 104, the one or more wagering services 108, the media device 120, the output device 121, and/or the mobile device 124 can be one or more computing devices, and some or all of the functions performed by these components may at times be performed by a single computing device. The content source 102, the encoder 104, the one or more wagering services 108, the media device 120, the output device 121, and/or the mobile device 124 may be configured to communicate through a network 116. The network 116 may facilitate sending content from the content source 102 to the media device 120 (or other device) at a user location 119. The network 116 may facilitate sending advertisements from the content source 102 to the media device 120 (or other device) at the user location 119. The network 116 may facilitate sending one or more supplemental features the media device 120 (or other device) at the user location 119. The network 116 may be a content delivery network, a content access network, combinations thereof, and the like. The network may be managed (e.g., deployed, serviced) by a content provider, a service provider, combinations thereof, and the like. The network 116 may be an optical fiber network, a coaxial cable network, a hybrid fiber-coaxial network, a wireless network, a satellite system, a direct broadcast system, or any combination thereof. The network 116 can be the Internet. The network 116 may have a network component 129. The network component 129 may be any device, module, combinations thereof, and the like communicatively coupled to the network 116. The network component 129 may be a router, a switch, a splitter, a packager, a gateway, an encoder, a storage device, a multiplexer, a network access location (e.g., tap), physical link, combinations thereof, and the like.

The content source 102 may be configured to send content (e.g., video, audio, movies, television, games, applications, data, etc.) to one or more devices such as the encoder 104, a network component 129, a first access point 123, the mobile device 124, a second access point 125 (which may be an upstream access point or other device such as a headend), and/or the media device 120. The content source may receive a content request from, for example, the media device 120, and/or the mobile device 124. The content may comprise primary content (e.g., television, movies, pay-per-view, on-demand, etc.) and/or the content may comprise secondary content (e.g., advertisements, supplemental features like overlays or pop-ups, applications, metadata, combinations thereof, and the like). For example, the content may comprise a basketball game. For example, the content may comprise an advertisement for a local car dealership or restaurant. For example, the content source 102 may receive a request for content from the media device 120. The content source 102 may receive the request for content from the media device based on a user interaction with the media via a remote control. For example, a user may tune to a channel or navigate an on-demand menu. The content source 102 may receive the request for the content based on a user interaction with the mobile device 124 (e.g., a user device such as a cell phone or laptop).

The content source 102 may send, towards the media device 120, the requested content. The content may comprise one or more content IDs. The encoder 104 may receive the content. The encoder 104 may comprise one or more encoders configured to encode metadata associated with the content into the content or into a related stream and send the related stream towards the media device 120 concurrently with the content based on the one or more content IDs. The encoder may determine metadata based on the one or more content IDs. For example, the content may comprise information associated with one or more wagering services. For example, the content may comprise a basketball game and metadata associated with the content may indicate one or more wagering services providing one or more wagering opportunities associated with the basketball game. The metadata indicating the one or more wagering services may comprise one or more uniform resource location identifiers or other similar identifiers. The metadata indicating the one or more wagering services may or may not be encoded in an audio track of the content.

The content source 102 may be configured to send streaming media, such as broadcast content, video on-demand content (e.g., VOD), content recordings, combinations thereof, and the like. The content source 102 may be managed by third party content providers, service providers, online content providers, over-the-top content providers, combinations thereof, and the like. The content may be sent based on a subscription, individual item purchase or rental, combinations thereof, and the like. The content source 102 may be configured to send the content via a packet switched network path, such as via an IP based connection. The content may comprise a single content item, a portion of a content item (e.g., content fragment), a content stream, a multiplex that includes several content items, combinations thereof, and the like. The content may comprise one or more data packets. The content may be accessed by users via applications, such as mobile applications, television applications, STB applications, gaming device applications, combinations thereof, and the like. An application may be a custom application (e.g., by content provider, for a specific device), a general content browser (e.g., web browser), an electronic program guide, combinations thereof, and the like.

The content may be comprise or otherwise be associated with a content ID configured to identify the content. For example, the content may comprise one or more data packets, one or more content segments, or the like which may comprise the content ID. The content ID may be a string of characters, numbers, symbols, etc. The content ID may, for example, be a title or description of the content. The content may be associated with a content destination. The content destination may be any one or more devices of the system 100 or the like. For example, the content destination may be the media device 120. The content destination may be associated with a content destination ID. The content destination ID may be a MAC address or some other identifier associated with the one or more devices of system 100. For example, the content destination may be a MAC address or IP associated with the media device 120 and/or the second access point 125 (e.g., a headend or VDE). The content may comprise one or more data packets the one or more data packets may comprise one or more fields. The one or more fields may comprise a destination header configured to contain the destination ID.

For example, the content source 102 may receive a content request from the media device 120. The content request may comprise a device ID associated with the media device 120. The content request may comprise a content ID associated with the requested content. The content source 102 may determine the device ID associated with the media device 120 is the destination ID and insert, into the destination field of the one or more data packets of content, the device ID.

The media device 120 may receive the content and other associated data (e.g., the metadata). The media device 120 may comprise a user device such as an STB, computer, mobile phone, combinations thereof, and the like. The media device 120 may be a digital streaming device, a gaming device, a media storage device, a digital recording device, a computing device, a mobile computing device (e.g., a laptop, a smartphone, a tablet, etc.), combinations thereof, and the like. Based on the metadata indicating the one or more wagering services, the media device 120 may cause an output device to output one or more inaudible signals. The one or more inaudible signals may comprise the one or more uniform resource locators associated with the one or more wagering services.

The one or more inaudible signals may comprise geolocation data. For example, the one or more inaudible signals may comprise geolocation data associated with the media device 120. The geolocation data may indicate a location of the media device 120. For example, the media device 120 may located in a jurisdiction that restricts gambling. For example, the media device 120 may be located in a jurisdiction that allows gambling.

One or more user devices (e.g., the mobile device 124) may detect the one or more inaudible signals. The one or more user devices may comprise, for example, one or more cell phones, one or more smart phones, one or more laptops, one or more tables, one or more virtual assistants (e.g., ALEXA, SIRI), combinations thereof, and the like. One or more applications may be resident on the one or more user devices. Based on detecting the one or more inaudible signals, the one or more user devices may send one or more requests to the one or more wagering services. For example, the one or more requests may be sent to the one or more URLs of the one or more wagering services. The one or more requests may comprise one or more requests for one or more wagering opportunities. The one or more requests may comprise one or more content IDs associated with the content, one or more device IDs associated with, for example, the media device 120, the one or more user devices (e.g., the mobile device 124), and/or the geolocation data.

The one or more wagering services 108 may receive the one or more requests. The one or more wagering services may determine, based on the one or more content IDs, the one or more device IDS, and/or the geolocation data, one or more wagering opportunities associated with the content. For example, a content ID of the one or more content IDs may indicate the content is an Atlanta Braves baseball game and may determine one or more wagering opportunities associated with the Atlanta Braves baseball game. The one or more wagering services may determine, based on the geolocation data, whether or not gambling is allowed in the location of the media device 120. If gambling is allowed, the one or more wagering services may send the one or more wagering opportunities to the one or more user devices.

The one or more user devices (e.g., the mobile device 124 or similar devices) may receive the one or more wagering opportunities. The one or more user device may output, for example via one or more applications, the one or more wagering opportunities. The one or more user devices may be configured to receive one or more user inputs associated with the one or more wagering opportunities and send, to the one or more wagering services, one or more wagers.

The URL that is sent via inaudible signal may comprise or otherwise be associated with one or more unique identifiers. The one or more user devices (e.g., the mobile device 124, when opening the one or more applications and/or accessing the one or more services, may pass the one or more unique identifiers associated with the URL sent via the inaudible signal to the application. Thus, the server hosting the one or more services, by virtue of receiving the one or more unique identifiers associated with the URL, may determine the media device 120 (e.g., a set-top-box) actually output the URL with proper geolocation information.

Returning to the components of system 100, the network 116 may comprise a network component 129. The network component 129 may be any device, module, combinations thereof, and the like communicatively coupled to the network 116. The network component 129 may also be a router, a switch, a splitter, a packager, a gateway, an encoder, a storage device, a multiplexer, a network access location (e.g., tap), physical link, combinations thereof, and the like.

The media device 120 may comprise a demodulator, decoder, frequency tuner, combinations thereof, and the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may implement one or more applications, such as content viewers, social media applications, news applications, gaming applications, content stores, electronic program guides, combinations thereof, and the like. Those skilled in the art will appreciate that the signal may be demodulated and/or decoded in a variety of equipment, including the communication terminal 122, a computer, a TV, a monitor, or a satellite dish. The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), combinations thereof, and the like. The communication terminal 122 may be configured for communication with the network 116 via a variety of protocols, such as IP, transmission control protocol, file transfer protocol, session initiation protocol, voice over IP (e.g., VOIP), combinations thereof, and the like. The communication terminal 122, for a cable network, may be configured to facilitate network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to facilitate access to the network 116 to devices configured with a compatible wireless radio, such as a mobile device 124, the media device 120, the display device 121, or other computing devices (e.g., laptops, sensor devices, security devices). The first access point 123 may be associated with a user managed network (e.g., local area network), a service provider managed network (e.g., public network for users of the service provider), combinations thereof, and the like. It should be noted that in some configurations, some or all of the first access point 123, the communication terminal 122, the media device 120, and the display device 121 may be implemented as a single device.

The user location 119 is not necessarily fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, combinations thereof, and the like. The mobile device 124 may communicate with a variety of access points (e.g., at different times and locations or simultaneously if within range of multiple access points), such as the first access point 123 or the second access point 125.

Figure 2:
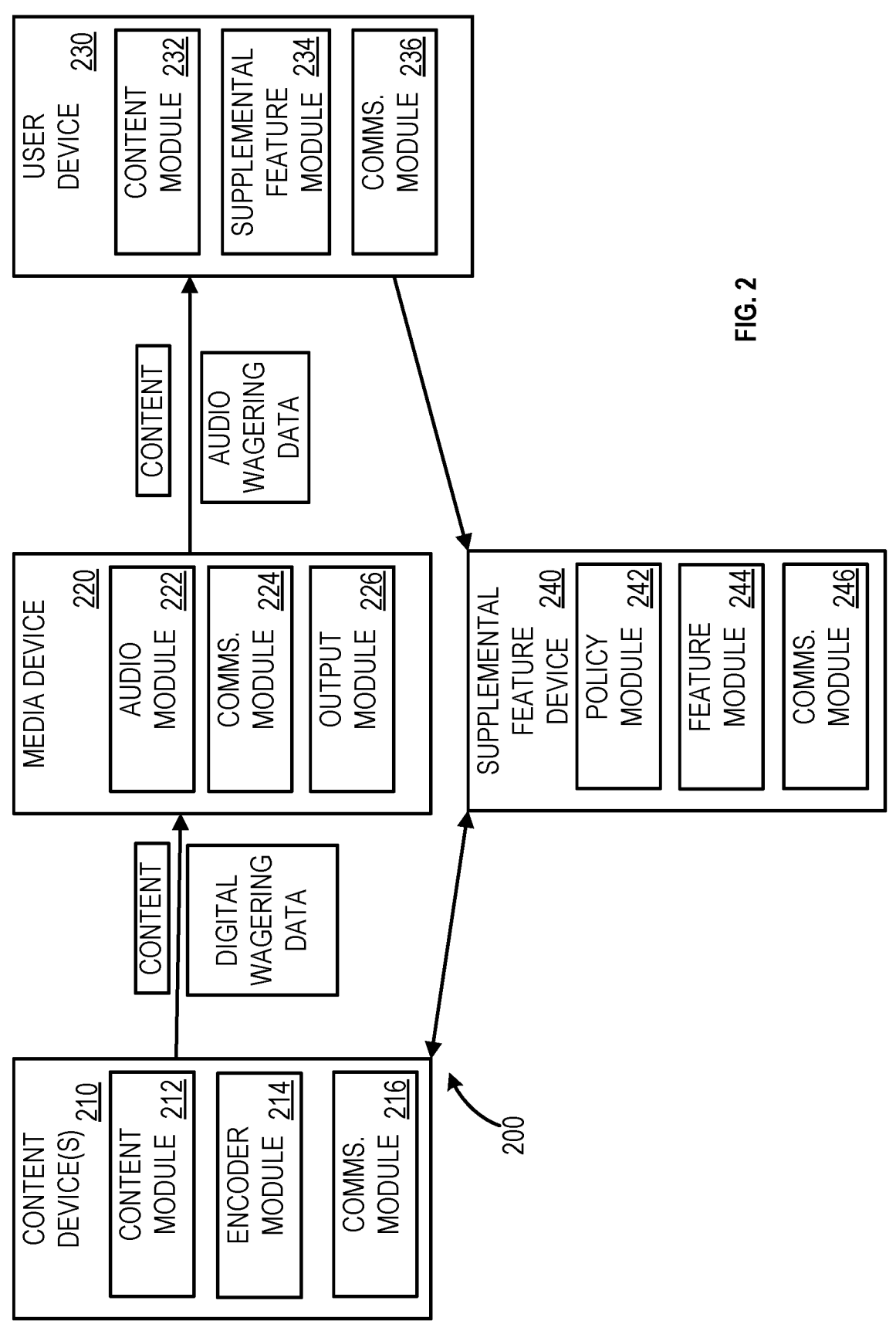
FIG. 2 shows an example system.

FIG. 2 shows an example system 200. The system 200 may comprise a content source 210 (e.g., the content source 102), a media device 220, a user device 230 (e.g., the mobile device 124), and a supplemental feature device 240 (e.g., the one or more wagering services). The content source 210 may send content to the media device 220.

The content source 210 may comprise a content module 212, an encoder module 214, and a communications module

216. The encoder module 214 may insert, into the content, data associated with one or more supplemental features (e.g., the one or more wagering service) and may send, along with the content, digital wagering data to the media device 220. The communications module 216 may be configured to receive, send, store, generate, or otherwise process data. The content module 212 may be configured to receive, send, store, generate, or otherwise process content. For example, the content source 210 may be configured to send content stored in the content module 212. The content module 212 may receive live content (e.g., from a content feed (not pictured)). For example, the content feed may be a camera configured to capture image data and generate a camera feed. The content source 210 may be a computing device configured to receive the camera feed and process it for distribution. For example, the content source 210 may send the content to the encoder 220.

The media device 220 may receive the content. For example, the media device 220 may comprise a set-top-box (STB), a mobile device (e.g., a smartphone), a computer, a laptop, combinations thereof, and the like. The media device 220 may comprise an audio module 222, a communications module 224, and may comprise or otherwise be associated with an output module (e.g., an output device such as a television). The audio module 222 may be configured to receive the digital wagering data and cause an output device associate with the media device (not pictured) to output the one or more inaudible signals comprising audio wagering data. The audio wagering data may comprise one or more uniform resource locators associated with the one or more wagering services. The communications module 224 may be configured to receive, send, store, generate, or otherwise process data. The output module 226 may be configured to receive and output data (e.g., the content, data configured to cause output of the one or more inaudible audio signals). For example, the output module may be configured to cause display of the content via a display device. The media device 220 may comprise the display device and/or the display device may be separate from the media device 220.

The user device 230 may receive the content and the one or more markers. For example, the user device 230 may comprise a smart phone (e.g., the mobile device 124) a computer, a laptop, combinations thereof, and the like. The user device 230 may comprise a content module 232, a supplemental feature module 234, and a communication module 236. The communications module 236 may be configured to receive, send, store, generate, or otherwise process data. The communications module may be configured to detect the one or more inaudible audio signals.

The one or more feature queries may comprise, for example, one or more user device identifiers associated with the user device, location data associated with the media device and/or the user device, timing data associated with the content and/or timing data associated with the one or more markers (e.g., a time at which the user device received the content, a time at which the user device output the content, a time at which the user device received the one or more markers). The one or more feature queries may comprise location data associated with the content and/or location data associated with the media device 220 and/or the user device 230. For example, the location data associated with the content may indicate a geographic location within which the content is to be distributed. The location data may indicate a geographic region within which the content originated (e.g., a live-feed). The one or more feature queries may comprise one or more content identifiers such as a title, channel, production company, copyright owner, distributor, content source, combinations thereof, and the like.

The user device 230 may send the one or more feature queries to the supplemental feature device 240. The supplemental feature device 240 may comprise one or more wagering services. The supplemental feature device may comprise a policy module 242, a feature module 244, and a communications module 246. The communications module 246 may be configured to receive, send, store, generate, or otherwise process data. The supplemental feature device 240 may determine, based on the one or more feature queries, one or more supplemental features to make available to the user device 230. Additionally and/or alternatively, the supplemental feature device 240 may determine that no supplemental features are available to the user device 230. For example, the policy module 242 may be configured to store one or more policies and determine whether the one or more policies are applicable to the content sent to the user device and/or applicable to the user device 230.

The one or more policies may comprise policy location information (e.g., a geographic region or other location where a given policy is or is not applicable), an applicability indication (e.g., applicable, not applicable), timing information (e.g., one or more policy start times, one or more policy end times), content information (e.g., one or more content titles, one or more content sources, one or more channels, one or more frequencies, one or more copyright owners, one or more distribution rights, one or more content locators such as a uniform resource locator (URL), combinations thereof, and the like). The one or more policies may indicate one or more rules (e.g., rules, regulations, laws, etc.) associated with one or more geographic regions (e.g., one or more jurisdictions). For example, a first piece of content may comprise a sports game (e.g., a live broadcast of an NBA game) and a first policy of the one or more policies may indicate gambling on the first piece of content is allowed in a first jurisdiction associated with a first user device while gambling on the first piece of content is not allowed in a second jurisdiction associated with a second user device. The one or more policies may indicate trick play (e.g., fast-forward) of the content is allowed in a first geographic region but not allowed in a second geographic region, or allowed for a first group of user devices but not for a second group of user devices.

Figure 6:
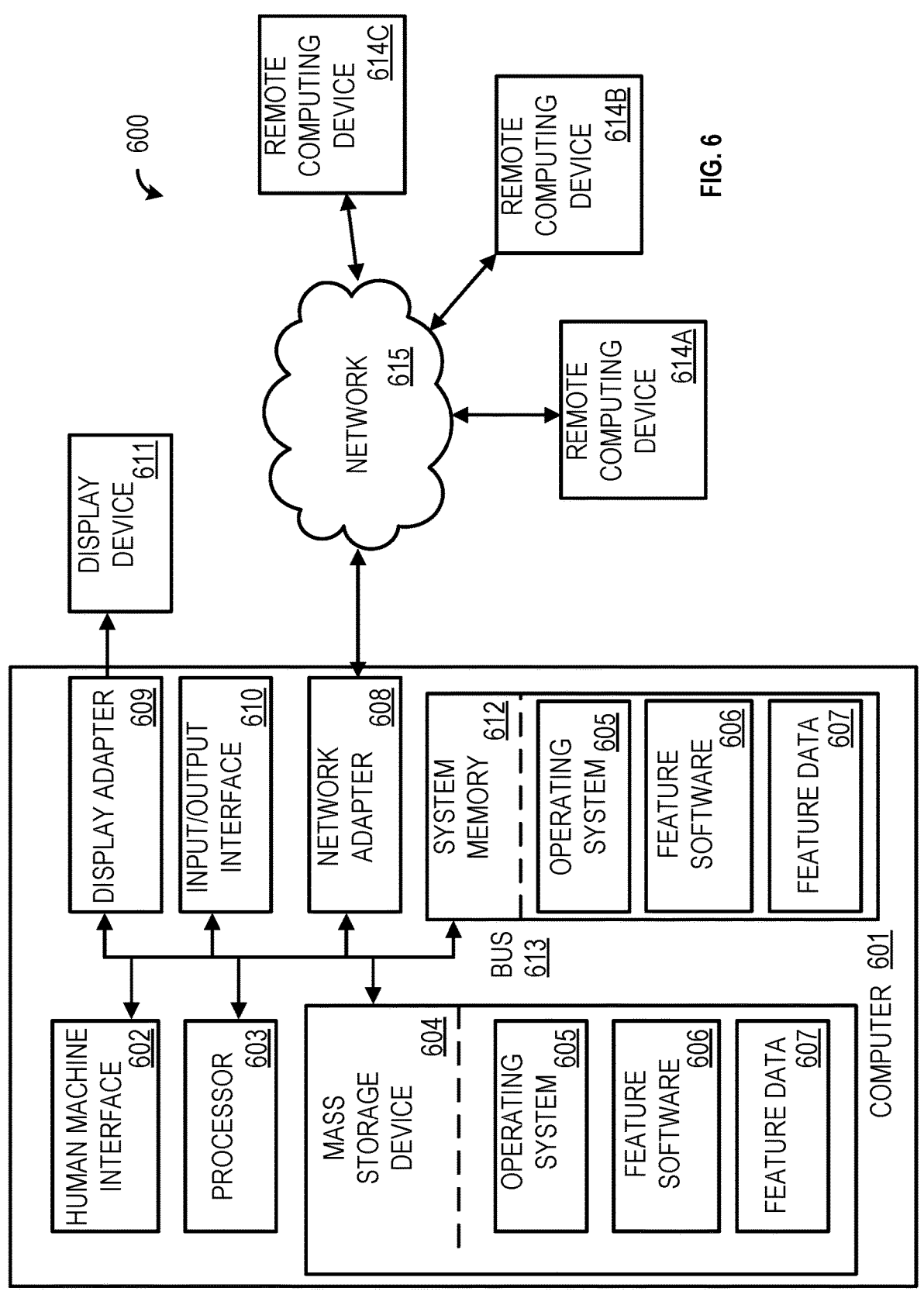
FIG. 6 shows an example system.

The feature module 244 may be configured to send and receive supplemental feature data to and from the user device 230 and/or any other device of FIG. 1, FIG. 2, and/or FIG. 6. The feature module may send, based on determining a policy applies to the user device 230, one or more supplemental features messages to the user device 230. The one or more supplemental feature messages may be configured to cause the user device to activate one or more supplemental features (e.g., via the supplemental feature module 234). The one or more supplemental feature messages may comprise one or more applications. The one or more supplemental features may comprise, for example, one or more functionalities associated with the content. The one or more functionalities may comprise for example, one or more wagering functionalities, one or more gaming functionalities, one or more social media functionalities, one or more transactional functionalities such as making purchases, one or more content functionalities such as one or more trick play functionalities, one or more recording functionalities, one or more editing functionalities, combinations thereof, and the like.

For example, the user device 230 may send the one or more feature queries to the supplemental feature device 240.

Based on the information in the one or more feature queries, the supplemental feature device 240 may determine the user device is located in Las Vegas Nevada and is receiving and/or outputting an Atlanta Hawks NBA game. The supplemental feature device 240 may determine, based on the one or more policies, that gambling on the Atlanta Hawks game is allowed in Las Vegas. Based on determining that gambling on the Atlanta Hawks game is allowed in Las Vegas, the feature module 244 may send a first supplemental feature message to the user device 230. The first supplemental feature message may be configured to cause the user device to launch a gambling applet (e.g., via the supplemental feature module 234) on the user device 230. The gambling applet may be configured to send and receive data. For example, the gambling applet may be configured to receive and display information related to the Atlanta Hawks game. The gambling applet may be configured to receive one or more user inputs and send and receive one or more subsequent supplemental feature messages based thereon. For example, the gambling applet may display odds related to the Atlanta Hawks game and may receive one or more wagers via a user interface associated with the gambling applet. The supplemental feature module may send the one or more wagers to the supplemental feature device where they may be processed by the feature module 244.

Figure 3:
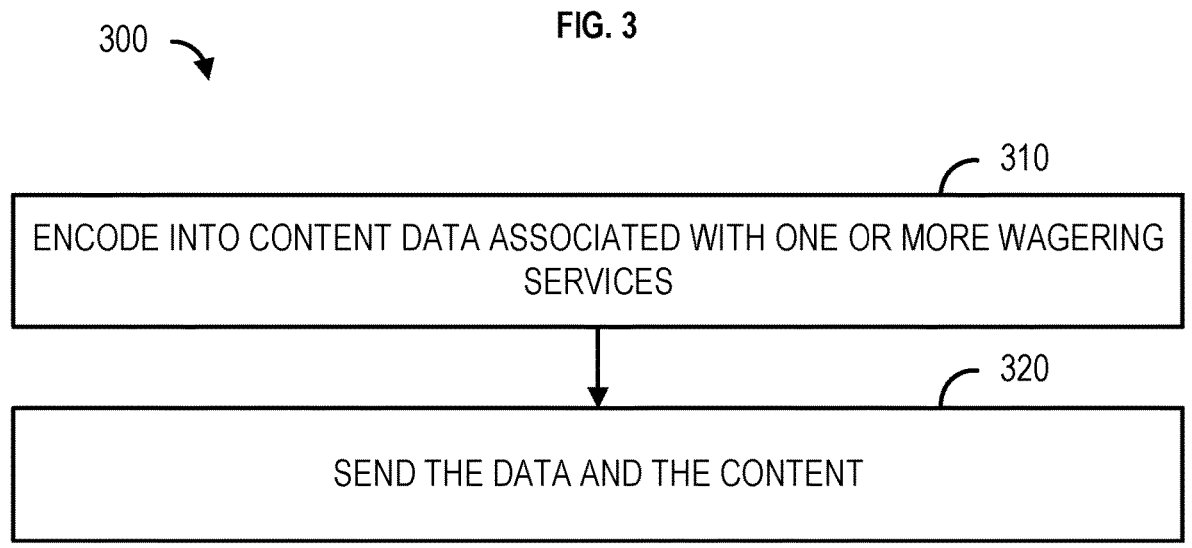
FIG. 3 shows an example method.

FIG. 3 shows a flowchart of a method 300 for content management. The method 700 may be carried out on any one or more of the devices described in FIG. 1, FIG. 2, and/or FIG. 6. At 310, data associated with one or more wagering services may be encoded into content and/or into a data stream or other data associated with content bound for a media device. The data content may be associated with one or more wagering services. For example, the content may comprise a sporting content, political content, or any other content or subject matter users may wager on. One or more wagering services may offer one or more wagering opportunities associated with the content. The data may be configured to cause one or more output devices to output one or more inaudible signals associated with the content, associated with the one or more wagering services, and/or associated with the one or more wagering opportunities. The data may comprise one or more content identifiers, one or more wagering service identifiers, one or more wagering opportunity identifiers, one or more device identifiers, and/or geolocation data. The geolocation data may be configured to ensure that only eligible receiving devices have access to the one or more wagering services and/or one or more wagering opportunities. The data associated with the one or more wagering services may comprise one or more uniform resource locators.

At 320, the content and the data associated with the one or more wagering services may be sent. For example, the content and the data associated with the one or more wagering services may be sent to a media device and/or a user device. For example, the media device may comprise a set-top-box or other similar device. The user device may comprise a smart phone, laptop, or other similar device.

The method may comprise causing a user device to access the one or more wagering services. For example, the user device may be caused to access the one or more wagering services based on the user device detecting the one or more inaudible signals emitted by an output device associated with the media device. For example, the user device may comprise an audio device (e.g., a microphone) and/or other hardware or software components configured to detect the one or more inaudible signals. The user device may comprise one or more applications configured to, based on detecting the one or more inaudible signals, send and receive data. For example, the one or more applications may be configured to send one or more requests for the one or more wagering opportunities. The one or more applications may be configured to send the one or more requests for the one or more wagering opportunities to the one or more wagering services.

The method may comprise blocking access, based on the geolocation data, to the one or more wagering services. The method may comprise blocking access, based on the geolocation data, to the one or more wagering opportunities. The method may comprise receiving, by a media device, content comprising data associated with one or more wagering services; and causing, based on the data associated with the one or more wagering services, an output device to emit an inaudible audio signal associated with the one or more wagering services wherein the inaudible audio signal is configured to cause a user device to access the one or more wagering services. The method may comprise detecting, by a user device, an inaudible audio signal output in content, wherein the inaudible audio signal is associated with one or more wagering services, based on detecting the inaudible audio signal, sending, to the one or more wagering services, a request for one or more wagering opportunities associated with the content; and receiving, from the one or more wagering services, based on the request, the one or more wagering opportunities.

The method may comprise determining, one or more supplemental content features. The one or more supplemental content features may comprise, for example, one or more gaming features. Determining the one or more supplemental content features may comprise determining, based on the one or more user device identifiers, location data associated with the one or more user devices. Determining the one or more supplemental content features may comprise determining, based on the location data, one or more gaming policies associated with the location data. For example, the location data may indicate one or more geographic location, one or more jurisdictions, or the like. The computing device may determine, for example, by querying a database, whether wagering on the content (e.g., gambling on a sporting event) is allowed in the one or more jurisdictions.

Figure 4:
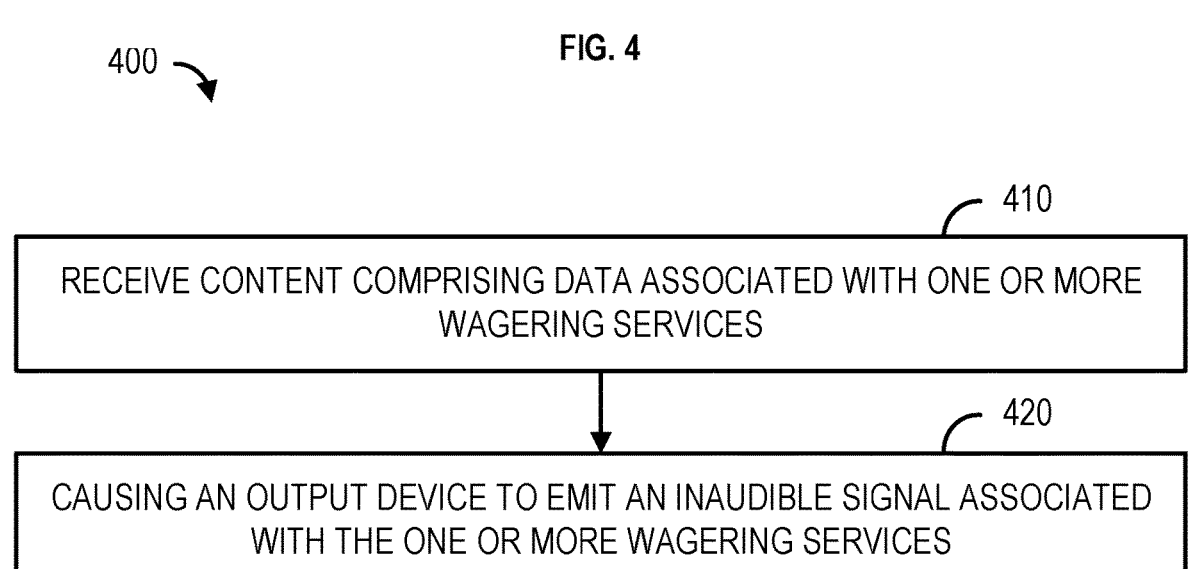
FIG. 4 shows an example method.

FIG. 4 shows an example method 400. The method 400 may be carried out on any one or more of the devices described in FIGS. 1, FIG. 2, and/or FIG. 6. At step 410, a media device may receive content comprising data associated with the one or more wagering services. The media device may comprise, for example, a set-top-box, computer, smartphone, or other device. The data associated with one or more wagering services may comprise one or more wagering service identifiers associated with the one or more wagering services. The data associated with the one or more wagering services may comprise geolocation data. The geolocation data may be associated with the content (e.g., indicating a location of content origin such as a sports stadium). The geolocation data may be associated with the media device that receives the content. The geolocation data may indicate one or more jurisdictional rules associated with the wagering services. For example, the geolocation data may indicate where wagering is allowed or not allowed. The media device may be configured to encode data into the content, or in a separate data stream sent to the output device.

At 420, an output device may be caused to emit an inaudible audio signal. The inaudible audio signal may be associated with the one or more wagering services. The one or more inaudible audio signals may be configured to cause a user device to access one or more wagering services. For example, the one or more inaudible signals may be associated with one or more wagering services. For example, the one or more inaudible signals may comprise information associated with the one or more wagering services. For example, the one or more inaudible signals may comprise an address (e.g., a uniform resource locator) or other information configured to cause a receiving device (e.g., a user device) to navigate to the address. The one or more inaudible signals may comprise geolocation data. The geolocation data may be encoded into the one or more inaudible signals. The one or more inaudible signals may be associated with the content. For example, the one or more inaudible signals may be associated with a sporting event output by the media device and may contain an identifier thereof or an address associated therewith.

The method may comprise encoding, into content associated with one or more wagering services, data associated with the one or more wagering services, wherein the data associated with the one or more wagering services is configured to cause an output device to emit an inaudible audio signal associated with the one or more wagering services; and sending the content and the data associated with the one or more wagering services.

The method may comprise detecting, by a user device, an inaudible audio signal output in content, wherein the inaudible audio signal is associated with one or more wagering services, based on detecting the inaudible audio signal, sending, to the one or more wagering services, a request for one or more wagering opportunities associated with the content; and receiving, from the one or more wagering services, based on the request, the one or more wagering opportunities.

The method may comprise causing the user device to send one or more requests for one or more wagering opportunities to the one or more wagering services. The method may comprise receiving, from the user device one or more wagering opportunities. The method may comprise outputting, via an output device associated with the media device, the one or more wagering opportunities. The method may comprise receiving, from the user device, one or more user inputs configured to place one or more wagers associated with the one or more wagering opportunities. The user device may comprise a smart phone, a computer, a remote control, combinations thereof, and the like.

Figure 5:
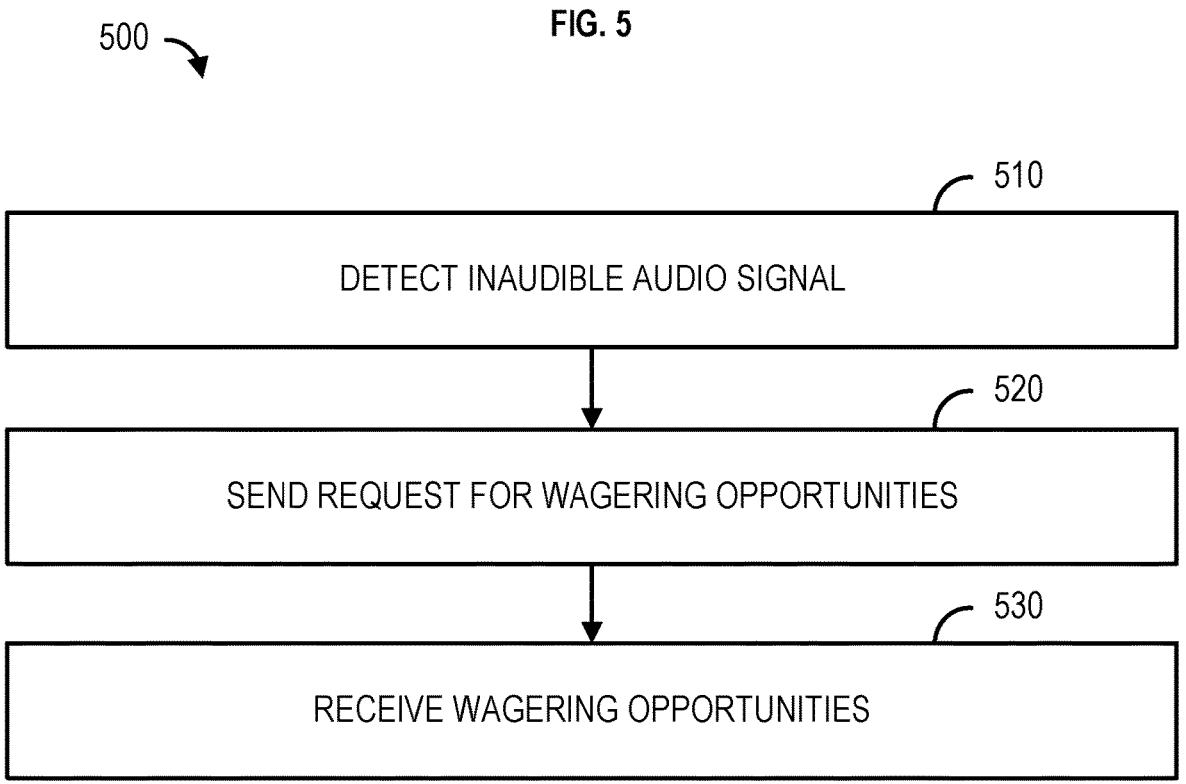
FIG. 5 shows an example method.

FIG. 5 shows an example method 500. The method 500 may be carried out on any one or more of the devices described in FIG. 1, FIG. 2, and/or FIG. 6. At step 510, a user device may detect one or more inaudible signals. The one or more inaudible signals may original from a media device. The one or more inaudible signals may be encoded in content output by the media device. For example, a set-top-box, gateway, access point, or other similar device may cause the media device to output the one or more inaudible signals. The one or more inaudible signals may be associated with one or more wagering services. For example, the one or more inaudible signals may comprise information associated with the one or more wagering services. For example, the one or more inaudible signals may comprise an address (e.g., a uniform resource locator) or other information configured to cause a receiving device (e.g., a user device) to navigate to the address. The one or more inaudible signals may comprise geolocation data. The geolocation data may be encoded into the one or more inaudible signals. The one or more inaudible signals may be associated with the content. For example, the one or more inaudible signals may be associated with a sporting event output by the media device and may contain an identifier thereof or an address associated therewith.

At 520, one or more requests for one or more wagering opportunities may be sent. The one or more requests for the one or more wagering opportunities may be sent by the user device based on detecting the one or more inaudible signals. For example, an application on the user device may detect the one or more inaudible signals and send the one or more requests for the one or more wagering opportunities to the one or more wagering services based thereon. The one or more requests may comprise, for example, a content identifier associated with the content, a user device identifier associated with the user device, a media device identifier associated with the media device, a user identifier associated with a user of the user device (e.g., a user profile), combinations thereof, and the like.

At 530, one or more wagering opportunities may be received. The one or more wagering opportunities may comprise one or more available wagers offered by the one or more wagering services. The one or more wagering opportunities may be associated with the content. For example, if the content is a Saint Louis Cardinals game, the one or more wagering opportunities may be associated with the Saint Louis Cardinals game.

The method may comprise receiving, via a user interface associated with the user device, one or more user inputs associated with the one or more wagering opportunities. The method may comprise sending, to the one or more wagering services, one or more wagers. The method may comprise outputting, via a user interface associated with the user device, the one or more wagering opportunities. The method may comprise sending, to the media device, to an access point, to a gateway, or other device, information associated with the one or more wagering opportunities. The method may comprise causing the one or more wagering opportunities to be output via a display device associated with the media device.

The method may comprise encoding, into content associated with one or more wagering services, data associated with the one or more wagering services, wherein the data associated with the one or more wagering services is configured to cause an output device to emit an inaudible audio signal associated with the one or more wagering services; and sending the content and the data associated with the one or more wagering services.

The method may comprise receiving, by a media device, content comprising data associated with one or more wagering services; and causing, based on the data associated with the one or more wagering services, an output device to emit an inaudible audio signal associated with the one or more wagering services wherein the inaudible audio signal is configured to cause a user device to access the one or more wagering services.

FIG. 6 shows a system 600 for content management. The media device 120, the output device 121, the communication terminal 122, the mobile device 124, the content source 102, the encoder 104, the one or more supplemental feature servers 108, and/or the network component 129 of FIG. 1 may be a computer 601 as shown in FIG. 6. The content device 210, the media device 220, the user device 230, and/or the supplemental feature device 240 of FIG. 2 may be a computer 601 as shown in FIG. 6. The computer 601 may comprise one or more processors 603, a system memory 612, and a bus 613 that couples various system components including the one or more processors 603 to the system memory 612. In the case of multiple processors 603, the computer 601 may utilize parallel computing. The bus 613 is one or more of several possible types of bus structures, including a memory bus or memory controller, a peripheral bus, an accelerated graphics port, or local bus using any of a variety of bus architectures.

The computer 601 may operate on and/or comprise a variety of computer readable media (e.g., non-transitory). The readable media may be any available media that is accessible by the computer 601 and may comprise both volatile and non-volatile media, removable and non-removable media. The system memory 612 has computer readable media in the form of volatile memory, such as random access memory (RAM), and/or non-volatile memory, such as read only memory (ROM). The system memory 612 may store data such as the feature data 607 and/or program modules such as the operating system 605 and the feature software 606 that are accessible to and/or are operated on by the one or more processors 603. The machine learning module may comprise one or more of the feature data 607 and/or the feature software 606.

The computer 601 may also comprise other removable/non-removable, volatile/non-volatile computer storage media. FIG. 6 shows the mass storage device 604 which may facilitate non-volatile storage of computer code, computer readable instructions, data structures, program modules, and other data for the computer 601. The mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 604, such as the operating system 605 and the feature software 606. Each of the operating system 605 and the feature software 606 (or some combination thereof) may comprise elements of the program modules and the feature software 606. The feature data 607 may also be stored on the mass storage device 604. The feature data 607 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 615.

A user may enter commands and information into the computer 601 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 603 via a human machine interface 602 that is coupled to the bus 613, but may be connected by other interface and bus structures, such as a parallel port, game port, an IEEE 1394 Port (also known as a Firewire port), a serial port, network adapter 608, and/or a universal serial bus (USB).

The display device 611 may also be connected to the bus 613 via an interface, such as the display adapter 609. It is contemplated that the computer 601 may comprise more than one display adapter 609 and the computer 601 may comprise more than one display device 611. The display device 611 may be a monitor, an LCD (Liquid Crystal Display), light emitting diode (LED) display, television, smart lens, smart glass, and/or a projector. In addition to the display device 611, other output peripheral devices may be components such as speakers (not shown) and a printer (not shown) which may be connected to the computer 601 via the Input/Output Interface 610. Any step and/or result of the methods may be output (or caused to be output) in any form to an output device. Such output may be any form of visual representation, including, but not limited to, textual, graphical, animation, audio, tactile, and the like. The display device 611 and computer 601 may be part of one device, or separate devices.

The computer 601 may operate in a networked environment using logical connections to one or more remote computing devices 614A,B,C. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 601 and a remote computing device 614A,B,C may be made via a network 615, such as a local area network (LAN) and/or a general wide area network (WAN). Such network connections may be through the network adapter 608. The network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components reside at various times in different storage components of the computing device 601, and are executed by the one or more processors 603 of the computer. An implementation of the feature software 606 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the quantity or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   encoding, into content associated with one or more wagering services, data associated with the one or more wagering services, wherein the data associated with the one or more wagering services is configured to cause an output device to emit an inaudible audio signal comprising geolocation data associated with the one or more wagering services; and
   sending the content and the data associated with the one or more wagering services.

2. The method of claim 1, wherein the data associated with the one or more wagering services comprises a uniform resource locator.

3. The method of claim 1, wherein the inaudible audio signal is configured to cause a user device to access the one or more wagering services.

4. The method of claim 1, wherein the data associated with the one or more wagering services comprises one or more identifiers associated with the one or more wagering services.

5. The method of claim 1, further comprising blocking access to the one or more wagering services based on the geolocation data and an identifier associated with a media device.

6. The method of claim 1, further comprising causing a media device to encode geolocation data into the inaudible audio signal.

7. The method of claim 1, further comprising causing, based on the inaudible audio signal, a user device to access the one or more wagering services.

8. A method comprising:
   receiving, by a media device, content comprising data associated with one or more wagering services; and
   causing, based on the data associated with the one or more wagering services, an output device to emit an inaudible audio signal comprising geolocation data associated with the one or more wagering services wherein the inaudible audio signal is configured to cause a user device to access the one or more wagering services.

9. The method of claim 8, wherein the media device comprises a set-top-box.

10. The method of claim 8, wherein the data associated with the one or more wagering services comprises a uniform resource locator.

11. The method of claim 8, wherein causing the output device to emit the inaudible audio signal comprises causing the output device to output a signal in a kilohertz range.

12. The method of claim 8, wherein the inaudible audio signal is further configured to cause the user device to access the one or more wagering services by sending, to the user device, via the inaudible audio signal, a uniform resource locator associated with the one or more wagering services.

13. The method of claim 8, further comprising determining, based on geolocation data, that the user device is in a jurisdiction where wagering is allowed.

14. The method of claim 8, further comprising determining, based on geolocation data, that the user device is in a jurisdiction where wagering is prohibited.

15. A method comprising:
   detecting, by a user device, an inaudible audio signal output in content, wherein the inaudible audio signal is associated with one or more wagering services and comprises geolocation data;
   based on detecting the inaudible audio signal, sending, to the one or more wagering services, the geolocation data and a request for one or more wagering opportunities associated with the content; and
   receiving, from the one or more wagering services, based on the request, the one or more wagering opportunities.

16. The method of claim 15, wherein the user device comprises one or more of: a smartphone or a computer.

17. The method of claim 15, wherein the inaudible audio signal comprises a uniform resource locator associated with the one or more wagering services.

18. The method of claim 15, wherein the request for the one or more wagering services comprises one or more identifiers associated with the user device.

19. The method of claim 15, further comprising:

receiving, via a user interface of the user device, one or more user inputs associated with the one or more wagering opportunities; and sending, to the one or more wagering services, one or more wagers.

20. The method of claim 15, further comprising outputting, via a user interface, the one or more wagering opportunities.

* * * * *